United States Patent
Lorenz

(10) Patent No.: US 7,524,107 B1
(45) Date of Patent: Apr. 28, 2009

(54) DUAL PURPOSE OUTPUT THERMOSTAT

(75) Inventor: Perry Scott Lorenz, Fort Collins, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 194 days.

(21) Appl. No.: 11/541,140

(22) Filed: Sep. 29, 2006

(51) Int. Cl.
*G01K 7/00* (2006.01)
*G01K 13/00* (2006.01)

(52) U.S. Cl. .................. 374/170; 374/141; 324/417

(58) Field of Classification Search .............. 374/1, 374/163, 172, 143, 144–146, 197, 198, E17.008, 374/E3.002, 170; 702/99, 132, 130; 165/258; 324/417; 320/154; 318/791; 219/511; 327/512, 327/513
See application file for complete search history.

(56) References Cited

U.S. PATENT DOCUMENTS

| | | | | |
|---|---|---|---|---|
| 5,085,526 A | * | 2/1992 | Sawtell et al. ............... | 374/101 |
| 5,731,686 A | * | 3/1998 | Malhi ......................... | 320/154 |
| 5,873,053 A | * | 2/1999 | Pricer et al. ................. | 702/130 |
| 6,006,996 A | * | 12/1999 | Bhatnagar .................. | 236/78 R |
| 6,355,576 B1 | * | 3/2002 | Haley et al. ................. | 438/745 |
| 6,424,225 B1 | * | 7/2002 | Choi et al. ................... | 330/289 |
| 6,531,911 B1 | * | 3/2003 | Hsu et al. .................... | 327/512 |
| 6,637,934 B1 | * | 10/2003 | Henderson et al. ........... | 374/178 |
| 6,691,923 B2 | * | 2/2004 | Shearer ...................... | 236/78 R |
| 6,889,152 B2 | * | 5/2005 | More .......................... | 702/99 |
| 6,924,758 B1 | * | 8/2005 | Lorenz ....................... | 341/144 |
| 6,937,958 B2 | * | 8/2005 | Gold et al. ................... | 702/132 |
| 6,995,544 B2 | * | 2/2006 | Sumimoto et al. ............ | 322/25 |
| 6,996,491 B2 | * | 2/2006 | Gold et al. ................... | 702/132 |
| 7,006,943 B1 | * | 2/2006 | Mitchell et al. .............. | 702/132 |
| 7,057,444 B2 | * | 6/2006 | Illegems ...................... | 327/541 |
| 7,219,022 B2 | * | 5/2007 | Wekhande .................... | 702/58 |
| 7,288,983 B1 | * | 10/2007 | Schwartsglass et al. ...... | 327/513 |
| 2001/0045470 A1 | * | 11/2001 | Poucher ........................ | 236/94 |
| 2005/0285662 A1 | * | 12/2005 | Furuta et al. ................. | 327/512 |

OTHER PUBLICATIONS

"LM88 Factory Programmable Dual Remote-Diode Thermostat," *National Semiconductor Corporation*, www.national.com, Aug. 2001, pp. 1-9.

"LM56 Dual Output Low Power Thermostat," *National Semiconductor Corporation*, www.national.com, Jan. 2006, pp. 1-13.

(Continued)

*Primary Examiner*—Patrick J Assouad
*Assistant Examiner*—Bret Adams
(74) *Attorney, Agent, or Firm*—Merchant & Gould, P.C.

(57) ABSTRACT

A thermostat circuit is arranged for dual purpose operation to save pins in a small package. The circuit includes a temperature sensor circuit, a trip-point reference circuit, a switching circuit, an amplifier circuit, and a comparator circuit. The trip-point reference circuit provides a reference voltage that corresponds to a desired trip-point level. The temperature sensor circuit provides a sense voltage that corresponds to temperature. During a normal operating mode the sense voltage is coupled to the input of the amplifier circuit via the switching circuit, while during a test mode the reference voltage is coupled to an input of the amplifier circuit. The amplifier circuit buffers a voltage to one output pin. The comparator circuit compares the reference voltage to the sense voltage to provide a trip-point detection voltage for another output pin. An input pin is provided for selection of either a test mode or a non-test mode.

20 Claims, 2 Drawing Sheets

OTHER PUBLICATIONS

"LM26 SOT-23, ±3° C Accurate, Factory Preset Thermostat," *National Semiconductor Corporation,* www.national.com, Feb. 2006, pp. 1-9.

"LM27 SOT-23, ±3° C Accurate, 120° C-150° C Factory Preset Thermostat," *National Semiconductor Corporation* www.national.com, Sep. 2006, pp. 1-9.

* cited by examiner

DUAL PURPOSE OUTPUT THERMOSTAT

FIELD OF THE INVENTION

The present invention is generally related to thermostat circuits. More particularly, the present invention relates to an apparatus and method for adding trip-point monitoring capabilities to a thermostat circuit.

BACKGROUND

Temperature sensors can be used in a wide variety of applications. Typically electronic devices are temperature sensitive and require temperature information in order to be able to protect the device from extreme temperatures. For example, the device may use the temperature information to control the speed of a fan. In other devices, the temperature information may be used to shut down the device when a predetermined temperature is reached or exceeded. The wide range of requirements for devices has led to the development of many different temperature sensors.

Some temperature sensors can be integrated into a larger micro-electronic circuit sometimes referred to as a "system on a chip" or SOC. Other temperature sensors can be in stand alone devices that are provided in small packages with very few pins. The present disclosure offers a significant advantage for temperature sensors in small device packages, where limited pins are available for use.

BRIEF DESCRIPTION OF THE DRAWINGS

Non-limiting and non-exhaustive embodiments are described with reference to the following drawings.

DETAILED DESCRIPTION

Figure 1:
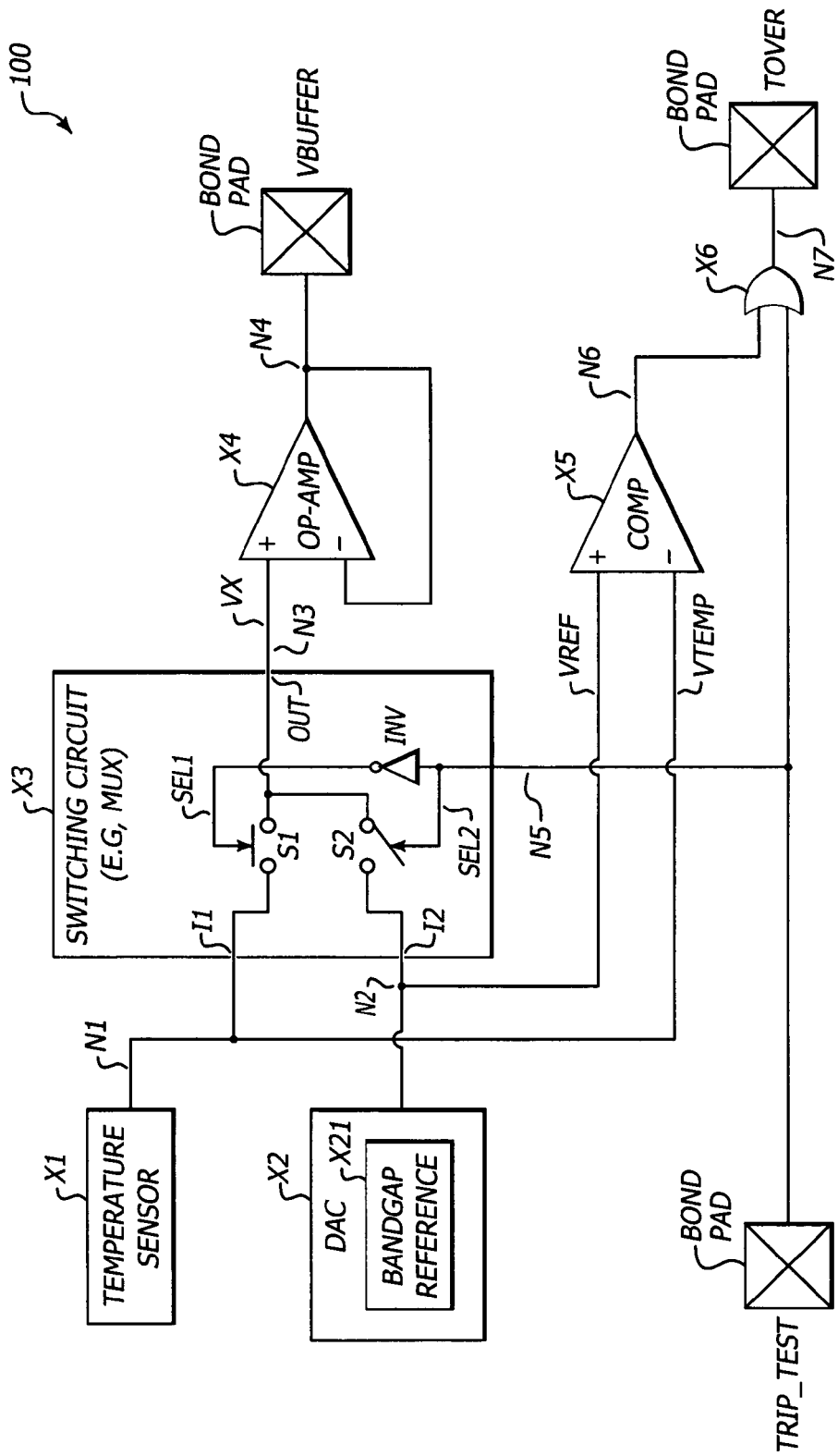
FIG. 1 is a schematic diagram illustrating a thermostat circuit that is arranged in accordance with the present disclosure.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context clearly dictates otherwise. The meanings identified below are not intended to limit the terms, but merely provide illustrative examples for use of the terms. The meaning of "a," "an," and "the" may include reference to both the singular and the plural. The meaning of "in" may include "in" and "on." The term "connected" may mean a direct electrical, electro-magnetic, mechanical, logical, or other connection between the items connected, without any electrical, mechanical, logical or other intermediary therebetween. The term "coupled" can mean a direct connection between items, an indirect connection through one or more intermediaries, or communication between items in a manner that may not constitute a connection. The term "circuit" can mean a single component or a plurality of components, active and/or passive, discrete or integrated, that are coupled together to provide a desired function. The term "signal" can mean at least one current, voltage, charge, data, or other such identifiable quantity Briefly stated, the present disclosure generally relates to a thermostat circuit that is arranged for dual purpose operation. The circuit includes a temperature sensor circuit, a trip-point reference circuit, a switching circuit, an amplifier circuit, and a comparator circuit. The trip-point reference circuit provides a reference voltage that corresponds to a desired trip-point level. The temperature sensor circuit provides a sense voltage that corresponds to temperature. During a normal operating mode the sense voltage is coupled to the input of the amplifier circuit via the switching circuit, while during a test mode the reference voltage is coupled to an input of the amplifier circuit. The amplifier circuit provides all necessary buffering/amplifying functions as a voltage to one output pin. The comparator circuit compares the reference voltage to the sense voltage to provide a trip-point detection voltage for another output pin. An input pin is provided for selection of either a test mode or a non-test mode.

FIG. 1 is a schematic diagram illustrating a thermostat circuit (100) that is arranged in accordance with the present disclosure. Circuit 100 includes a temperature sensor circuit (X1), a trip-point reference circuit (X2), a switching circuit (X3), an amplifier circuit (X4), a comparator circuit (X5), and an optional logic circuit (X6).

The temperature sensor circuit (X1) is arranged to provide a sense voltage (VTEMP) to node N1, where the sense voltage corresponds to a sensed temperature. The trip-point reference circuit (X2) is arranged to provide a reference voltage (VREF) at node N2, where the reference voltage corresponds to a desired trip-point level. The switching circuit (X3) is arranged to receive the voltages from nodes N1 and N2, and select one of those voltages in response to a test mode control signal (TRIP_TEST). The selected voltage is coupled to node N3, which is an input of the amplifier circuit X4. The output of the amplifier circuit (X4) is coupled to node N4, which is shown as a bonding pad in an integrated circuit corresponding to VBUFFER. The comparator circuit (X5) is arranged to compare the voltages from nodes N1 and N2, and provide an output to node N6.

During a normal operating mode (i.e., a non-test mode) the sense voltage (VTEMP) is coupled to the input of the amplifier circuit (X3) at node N3 via the switching circuit (X3), thus providing an analog voltage representation of the temperature. During a test mode the reference voltage (VREF) is coupled to the input of the amplifier circuit at node N3 via the switching circuit (X3). The amplifier circuit (X3) receives a voltage (VX) from node N3 and appropriately processes the voltage to provide an analog output voltage (VBUFFER) at node N3. The amplifier circuit of FIG. 1 (X4) is illustrated as a voltage buffer where an operational amplifier (OP-AMP) includes a non-inverting input coupled to node N3, and an inverting input coupled in common with the amplifier output at node N4. However, the amplifier circuit can be arranged as any appropriate amplifier/buffer circuit that may be desired.

In some applications, the trip-point associated with the thermostat circuit is factory programmed or factory trimmed. In such applications, the trip-point cannot be changed once the thermostat circuit is packaged and sent to a customer. In other applications, the trip-point can be programmed by the customer to one of a number of pre-selected settings from the factory. The present disclosure has identified that conventional thermostat circuits do not provide any access to the internally set trip-point. The present disclosure describes a thermostat circuit that can be configured after receipt by the customer such that the analog output voltage (VBUFFER) associated with the trip-point level can be evaluated external to the integrated circuit. The customer can also verify that the trip-point associated with the comparator equals the sensed voltage when the comparator trips (i.e., verifying comparator operation while testing for offset and other error causing conditions).

The trip-point reference circuit (X2) is arranged to provide a reference voltage (VREF) at node N2, where the reference voltage (VREF) is a factory set trip point. In some applications the user can select the trip-point from one of a number of available factory settings. The trip-point reference circuit (X2) can be any appropriate voltage reference circuit that is temperature compensated such as from a band-gap reference circuit (X21). The voltage reference circuit can be also implemented as any appropriate topology, including but not limited to a regulated voltage source topology, or as a digital-to-analog converter (DAC) topology.

The switching circuit (X3) is arranged to receive the voltages from nodes N1 and N2, and select one of those voltages in response to a test mode control signal (TRIP_TEST). In one example, the switching circuit is arranged to provide a 2-1 multiplexing (MUX) function that is implemented as two switching circuits (S1 and S2), and a logic circuit such as an inverter (INV). The first switching circuit (S1) is coupled between node N1 and node N3, and responsive to a first selection signal (SEL1). The second switching circuit (S2) is coupled between node N2 and node N3, and responsive to a second selection signal (SEL2). The first selection signal (SEL1) is inversely related to the second selection signal (SEL2) as illustrated by the inverter (INV). The first selection signal thus corresponds to TRIP_TEST, while the second selection signal corresponds to an inverse of TRIP_TEST. However, the polarity of the selection signals is merely an example and not intended to limit the present disclosure.

The optional logic circuit (X6) is shown as an OR logic circuit that includes a first input at node N5 (TRIP_TEST), a second input at node N6, and an output at node N7, which is shown as a bonding pad in an integrated circuit correspond to TOVER. In some implementations logic circuit X6 is eliminated and node N6 is coupled to the binding pad corresponding to TOVER. In other implementations logic circuit X6 can be another logic function such as, for example, NOR, AND, OR, NOR, XOR, etc. The implementation that is illustrated in FIG. 1 employs an OR logic circuit such that TOVER signal can be forced to a high logic condition in response to the TRIP_TEST signal to simulate an over-temperature condition. Since the over-temperature condition can be forced via TRIP_TEST, in-circuit testing can be accomplished for over-temperature conditions without the necessity of forcing the temperature sensor to a particular operating temperature condition.

An additional pin can be added to the integrated circuit that has an opposite polarity to TOVER. Such an output can be implemented as an open drain output as will be understood to those of skill in the art.

The various amplifier and comparator circuits that are described with reference to FIG. 1 can be implemented in any appropriate processing technology, including but not limited to, field effect transistors (FETs), metal-oxide semiconductor (MOS) devices, and bipolar junction transistors (BJTs), as well as others.

The switching circuits employed in the various circuits described herein can be any transistor technology that is arranged to provide a switching function. In one example, the switching circuits are field effect transistors (FETs) such as metal-oxide semiconductor (MOS) devices. However, the same circuit configuration is equally applicable for bipolar junction transistors (BJTs), as well as others. Other example circuits that perform the switching functions described above are considered within the scope of the present disclosure.

Figure 2:
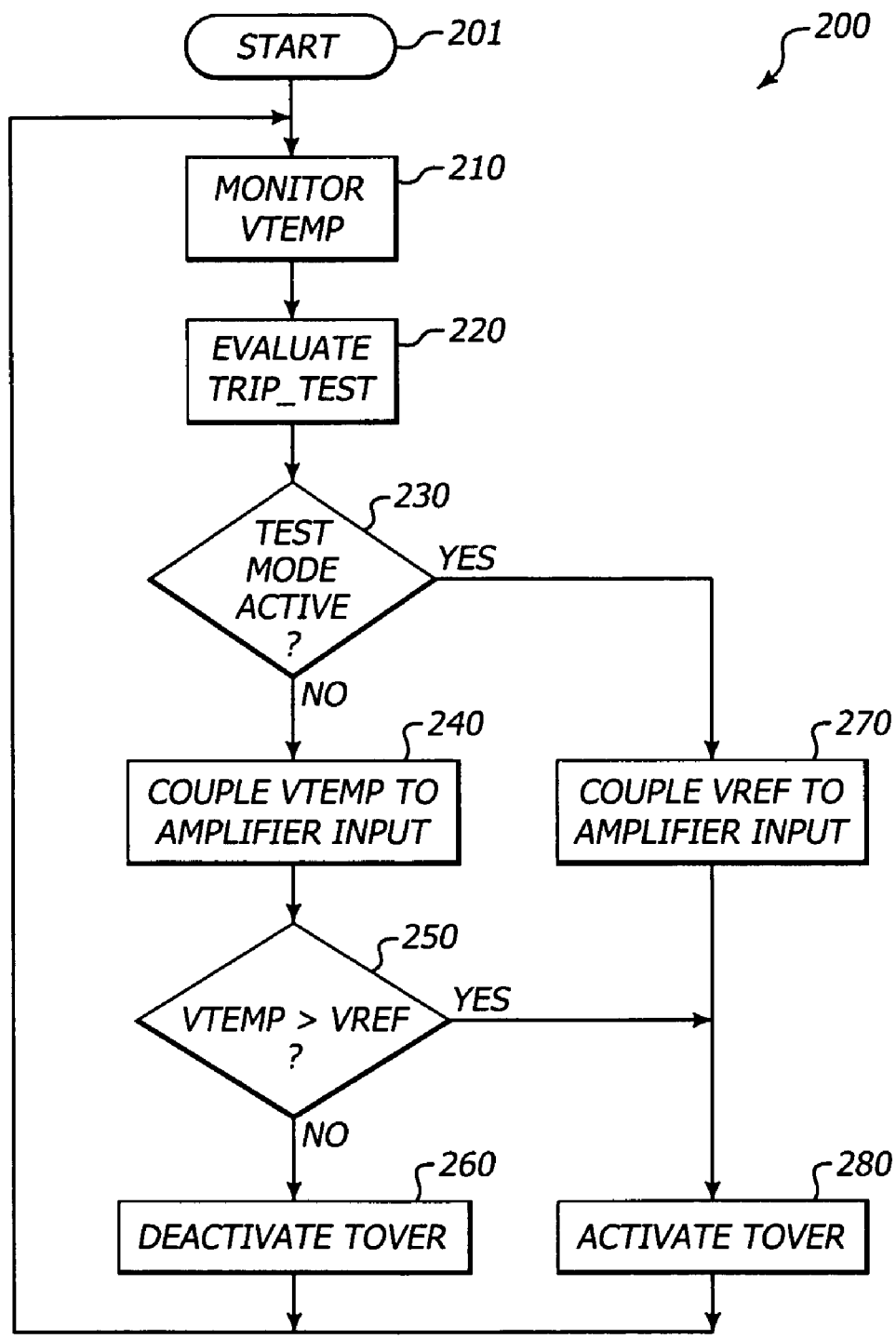
FIG. 2 is a flow chart illustrating a process flow for a thermostat circuit that is arranged in accordance with the present disclosure.

FIG. 2 is a flow chart illustrating a process flow (200) for a thermostat that is arranged in accordance with the present disclosure. Processing begins at block 201, and proceeds to block 210

At block 210 the temperature is monitored such as via signal VTEMP from temperature sensor circuit X1 from FIG. 1. Continuing to block 220, the thermostat evaluates the test mode condition via signal TRIP_TEST. Decision block 230 determines whether or not the test mode is active (e.g., switching circuit X3 includes a means for evaluating the TRIP_TEST signal such as via a logic circuit), where processing continues to block 240 when the normal mode is active (i.e., the test mode is inactive) and processing continues to block 270 when the test mode is active.

At block 240 where the switching circuit couples the sense signal (e.g., the VTEMP) to the amplifier's input so that the output of the amplifier corresponds to a sensed temperature for the thermostat. Processing continues from block 240 to decision block 250, which determines if the sensed temperature (VTEMP) has reached the trip point (e.g., VTEMP≧VREF, or VTEMP>VREF depending on the configuration). When the sensed temperature is still below the trip point, processing continues to block 260 where the over-temperature indicator (TOVER) is deactivated. Alternatively, processing continues from block 250 to block 280 when the sensed temperature has exceeded the trip-point. At block 280, the over-temperature indicator (TOVER) is activated.

When the test mode is active, processing flows from decision block 230 to block 270. At block 270, the switching circuit couples the reference signal (e.g., VREF) to the amplifier's input so that the output of the amplifier corresponds to the reference level that is used to trip the over-temperature condition with the comparator circuit. Processing continues from block 270 to block 280, where the over-temperature indicator (TOVER) is activated.

Although the invention has been described herein by way of exemplary embodiments, variations in the structures and methods described herein may be made without departing from the spirit and scope of the invention. For example, the positioning of the various components may be varied. Individual components and arrangements of components may be substituted as known to the art. Since many embodiments of the invention can be made without departing from the spirit and scope of the invention, the invention is not limited except as by the appended claims.

The invention claimed is:

1. A thermostat circuit that is provided as an integrated circuit, comprising:

a temperature sensor circuit that is arranged to sense an operating temperature associated with the thermostat circuit to provide a sense signal to a first node;

a trip-point reference circuit that is factory adjusted to provide a temperature compensated reference signal to a second node;

a switching circuit that includes a first input that is coupled to the first node, a second input that is coupled to the second node, a control input that is coupled to a fifth node, and an output that is coupled to a third node, wherein the switching circuit is arranged to selectively couple one of the first node and the second node to the third node in response to a control signal that is received at the fifth node; wherein the fifth node is configured to receive the control signal from a source external to the thermostat circuit;
an amplifier circuit that includes an input coupled to the third node and an output coupled to a fourth node, wherein the fourth node corresponds to an analog output terminal;
a comparator circuit that includes a first input that is coupled to the first node, a second input that is coupled to the second node, and an output that is coupled to a sixth node, wherein the sixth node corresponds to a comparator output terminal; and
a logic circuit that generates an output voltage in response to the output of the comparator circuit and the external control signal.

2. The thermostat circuit of claim 1, wherein the sense signal and the temperature compensated reference signal both correspond to voltages.

3. The thermostat circuit of claim 1, the trip-point reference circuit comprising a bandgap circuit.

4. The thermostat circuit of claim 1, the trip-point reference circuit comprising either a digital-to-analog converter circuit or a regulator circuit.

5. The thermostat circuit of claim 1, wherein the trip-point reference circuit is arranged for user selection of the temperature compensated reference signal from one of a number of factory adjusted settings.

6. The thermostat circuit of claim 1, wherein the fourth node, the fifth node, and the sixth node are each coupled to a respective bonding pad of the integrated circuit.

7. The thermostat circuit of claim 1, wherein the logic circuit that includes a first input coupled to the fifth node, a second input coupled to the sixth node, and an output that is coupled to a seventh node, wherein the fourth node, the fifth node, and the seventh node are each coupled to a respective bonding pad of the integrated circuit.

8. The thermostat circuit of claim 7, wherein the logic circuit is arranged to provide an OR logic function.

9. The thermostat circuit of claim 1, wherein the switching circuit comprises a multiplexer circuit that is responsive to the control signal.

10. The thermostat circuit of claim 1, wherein the switching circuit comprises a first switching circuit that is coupled between the first node and the third node, and a second switching circuit that is coupled between the second node and the third node, wherein the first switching circuit and the second switching circuit are responsive to the control signal such that one of the first and second switching circuits is operated in a closed circuit position when the other of the first and second switching circuits is operated in an open circuit position.

11. The thermostat of claim 1, wherein the amplifier circuit comprises a buffer circuit.

12. The thermostat of claim 1, further comprising an open drain output that is arranged to provide an inverse of the reference voltage to a bonding pad of the integrated circuit.

13. The thermostat of claim 1, wherein the amplifier circuit is implemented either field effect transistors (FETs), metal oxide semiconductor (MOS) transistors, or bipolar junction transistors (BJTs).

14. A thermostat apparatus that is provided as an integrated circuit, comprising:
a temperature sensor means that is arranged to sense an operating temperature associated with the thermostat circuit to provide a sense signal;
a trip-point reference means that is factory adjusted to provide a temperature compensated reference signal;
an amplifier means that is arranged to process an input signal to provide an analog output signal to an analog output terminal;
a comparator means that is arranged to compare the sense signal to the temperature compensated reference signal to provide a comparator output signal to a comparator output terminal when enabled; wherein enabling the comparator output terminal is responsive to a logic circuit that operates responsive to the comparator output signal and an external control signal; and
a selective coupling means that is arranged to selectively couple one of the sense signal and the temperature compensated reference signal to the amplifier means as the input signal in response to a test mode control signal that is provided from a test mode input terminal; wherein the test mode input terminal is configured to receive the external control signal from an external source.

15. The thermostat apparatus of claim 14, further comprising a logic means that includes a first input coupled to the comparator output terminal, a second input coupled to the test mode input terminal, and an output corresponding to an over-temperature indicator terminal, wherein the analog output terminal, the over-temperature indicator terminal, and the test mode input terminal are each coupled to a respective bonding pad of the integrated circuit.

16. A method for a thermostat that is provided as an integrated circuit, the method comprising:
monitoring a temperature associated with the integrated circuit to provide a sense signal;
generating a reference signal for the thermostat from a factory adjusted setting, wherein the reference signal is associated with a trip-point in the thermostat;
receiving a control signal from an external source;
determining a mode associated with the thermostat in response to the control signal received from the external source, wherein the mode corresponds to one of a test mode and a normal operating mode;
coupling the sense signal to an amplifier input when the determined mode corresponds to the normal operating mode;
coupling the reference signal to an amplifier input when the determined mode corresponds to the test mode;
evaluating the sense signal to determine if the trip-point has been reached;
asserting a comparator output when the trip-point has been reached; and
generating an output signal in response to the comparator output and the control signal.

17. The method of claim 16, further comprising selecting another reference signal for the thermostat from another factory adjusted setting in response to a user input.

18. The method of claim 16, further comprising asserting an over-temperature signal when either the comparator output is asserted, or the test mode is active.

19. The method of claim 16, wherein generating the reference signal further comprises temperature compensating the reference signal with a bandgap reference circuit in the integrated circuit.

20. The method of claim 16, wherein generating the reference signal further comprises adjusting the reference signal with a digital-to-analog converter (DAC) in the integrated circuit.

* * * * *